Oct. 24, 1939. R. A. SANDBERG 2,177,190
BUMPER GUARD
Filed May 27, 1938 2 Sheets-Sheet 2
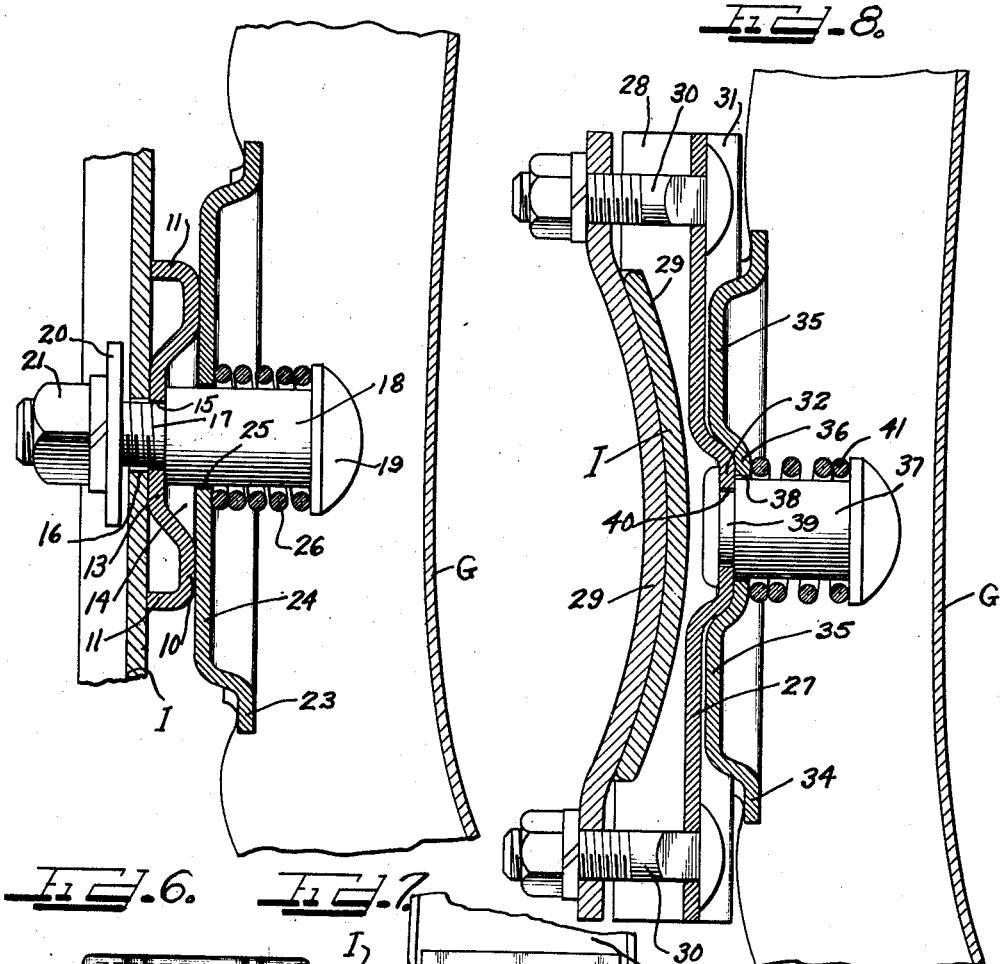
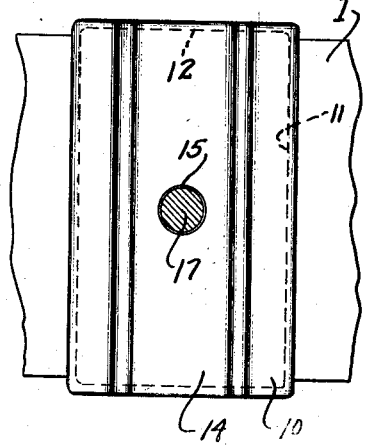
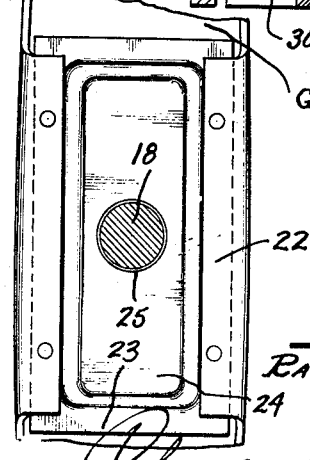
Inventor
Ray A. Sandberg.

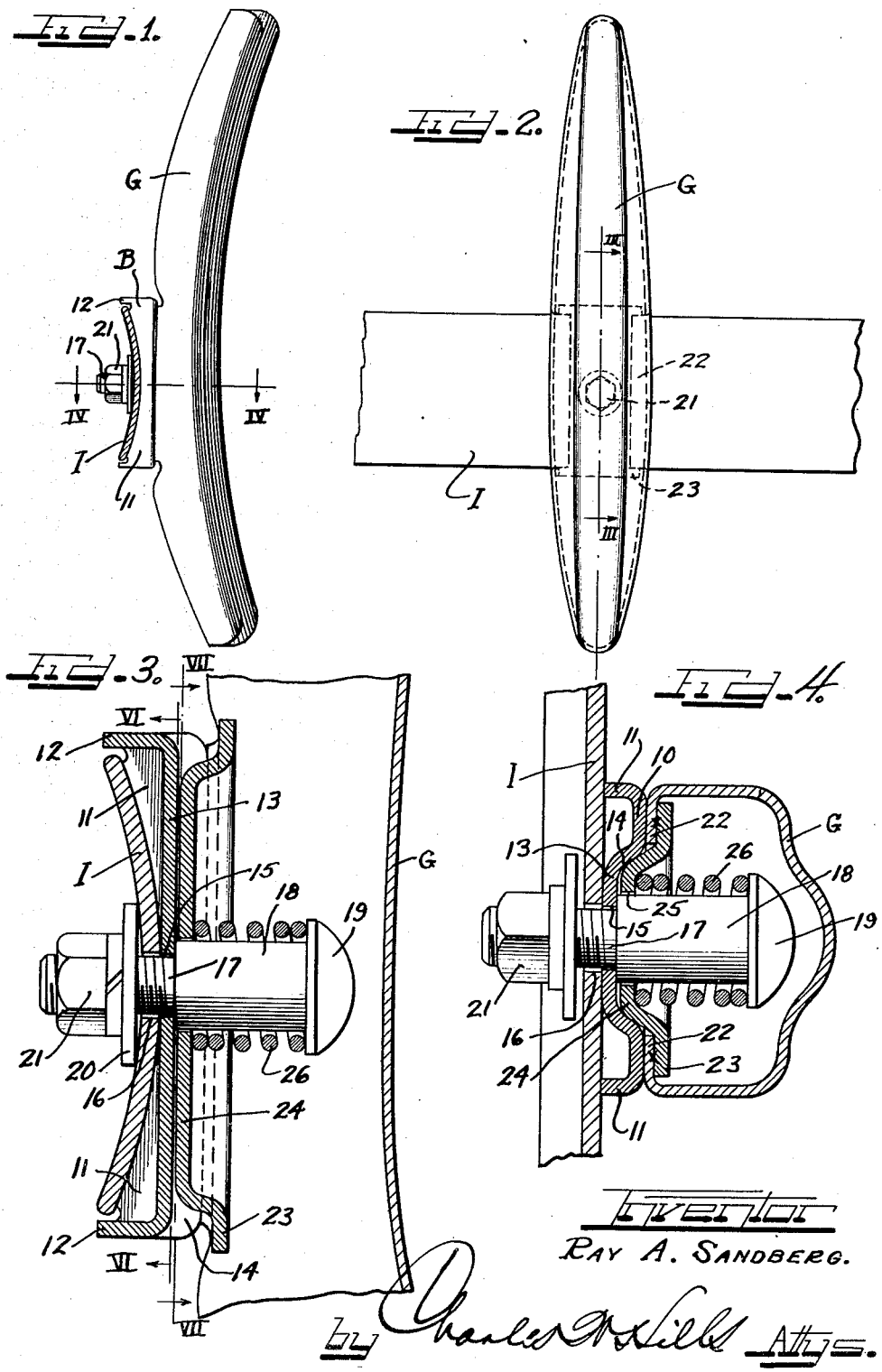

Patented Oct. 24, 1939

2,177,190

UNITED STATES PATENT OFFICE 2,177,190

BUMPER GUARD

Ray A. Sandberg, Waukegan, Ill., assignor, by mesne assignments, to Houdaille-Hershey Corporation, Detroit, Mich., a corporation of Michigan Application May 27, 1938, Serial No. 210,341

4 Claims. (Cl. 293—55)

This invention relates to bumper guards adapted to be mounted on the front bumper of an automobile to protect the radiator structure and grille guard therefor, or to be mounted on the rear bumper structure for protection of the rear end of the automobile, the object of the invention being to provide a simple and efficient arrangement for adapting the guards to be moved into an out of the way position so as not to interfere with cranking of the car or with the opening of the door of the baggage compartment at the rear of the vehicle body.

More in detail, an important object of the invention is to provide a guard structure comprising a bracket element adapted to be clamped or secured to the impact bar of the bumper, and a guard element normally interlocked under spring pressure with the bracket element to be held in service position transversely of the bumper impact bar and to be rotated by hand or foot pressure into position parallel with the bumper impact bar, with the rotation of the guard element automatically disconnecting the spring resisted interlock and the spring then serving to hold the impact element in its horizontal position where it will be out of the way for cranking purposes or for permitting opening of the baggage compartment door.

A further important object is to provide an arrangement with which pressure or bump against the ends of the guard element, when in service position, in a direction longitudinally or substantially longitudinally of the vehicle, will not effect release of the spring controlled interlock, but such pressure or bump will more firmly interlock the guard and bracket elements so that the guard element cannot be displaced from service position by bumps ordinarily received thereby from bumpers on other cars.

The various features of the invention are shown embodied in the structure disclosed on the accompanying drawings, in which drawings:

Figure 1 is a side elevation of the guard structure mounted on a bumper impact bar shown in cross section;

Figure 2 is a front elevation of the structure shown in Figure 1;

Figure 3 is an enlarged section on plane III—III of Figure 2;

Figure 4 is an enlarged section on plane IV—IV of Figure 1;

Figure 5 is a view like Figure 4 but with the guard element in horizontal position;

Figure 6 is a section on plane VI—VI of Figure 3;

Figure 7 is a section on plane VII—VII of Figure 3; and

Figure 8 is a view like Figure 3 showing a modified arrangement.

The guard structure comprises a bracket element B and a guard element G. In the arrangement of Figures 1 to 7, the bracket element comprises a rectangular metal base or plate 10 deflected to provide longitudinally extending side flanges 11 and end flanges 12. The side flanges 11 are shaped at their outer edges to fit against the outer face of the convexly curved impact bar I of an automobile bumper structure, while the end flanges 12 may extend a sufficient distance to overlie the upper and lower edges of the impact bar, as clearly shown in Figure 3.

The longitudinally extending median portion 13 of the bracket plate 10 is deflected inwardly to provide the longitudinally extending channel 14 at its outer side, which channel is of substantially frusto conical cross section with the corners rounded, the deflected part 13 at its middle point abutting against the front face of the bar I. At its middle point, the deflected part has the hole 15 for registration with a hole 16 in the bumper bar I for reception of the threaded reduced end 17 on the body 18 of a bolt 19, the threaded end receiving a washer 20 and nut 21 so that the bracket structure and the bar I are securely clamped between the washer and the bolt body 18 to rigidly secure the bracket element to the bumper bar with its channel 14 extending vertically.

The guard element may be of any suitable design. As shown, it is formed of sheet metal and is of substantially U shape in cross section, and it is provided with inwardly extending lips 22 against the inner side of which is secured, as by spot welding, a sheet metal plate 23. The median portion of this plate 23 is deflected outwardly to form a rectangular tongue structure whose longitudinal sides are inclined and rounded so that it will fit into and mate with the channel 14 of the bracket structure when the guard element is in vertical or service position, as shown in Figures 1 to 4. The deflected portion 24 forming the tongue structure has the hole 25 for receiving the body 18 of the bolt, and a spring 26 is interposed between the inner side of the tongue portion and the head of the bolt, this spring tending to hold the tongue portion in the channel of the bracket element to thereby hold the guard element in its vertical or service position on the bumper impact bar I.

When the guard structure is mounted at the middle of the front bumper, it will protect the front of the vehicle and particularly the radiator structure, and when the guard structure is mounted on the rear bumper, it will protect the rear of the car. Where the guard element extends upwardly a considerable distance, it may interfere with cranking of the car or with opening of the door for the baggage compartment at the rear of the car. To move the guard element G out of the way for cranking or for opening of the baggage compartment of the car, the guard element is rotated on the axis of the bolt into horizontal position parallel with the bumper impact bar I, as shown in Figure 5, and such turning of the guard element may readily be accomplished by hand or foot pressure applied to either end of the guard. When the guard element is thus turned, the rounded corners of the tongue structure 24 of the guard element and the rounded corners of the channel 14 of the bracket element will allow the tongue structure to be cammed out of the channel so that the tongue structure will then extend transversely across and against the outer side of the bracket element and will be frictionally held in such position by the force of the spring 26. When it is desired to return the guard element to its service position, it is turned back to vertical position, and the spring will then snap the tongue structure back into the bracket channel for interlock of the guard element and bracket.

The guard element G is preferably longitudinally curved so as to present a concave front. If the guard element is struck on either end by the bumper of another car in a direction substantially longitudinally of the car, it will swing a distance rearwardly but such swing will not be sufficient to disengage the guard tongue structure from the bracket channel because the spring 26 is dimensioned so that after such limited swing of the guard element, the spring will be fully compressed and further swing will be prevented. Suppose that the guard element is bumped at its upper end. The resulting rearward swing may tend to effect disengagement of the guard tongue from the bracket channel below the bolt connection, but above the bolt connection the tongue and channel will be more firmly held together so that the guard element will be prevented from rotating on the bolt out of its vertical or service position. If the guard element is struck at its lower end, the interlock below the bolt connection will be maintained so that the guard cannot be rotated. It is therefore evident that any bump against the guard element which would tend to swing it rearwardly would result only in firmer interlocking engagement and prevention of turning of the guard element out of its service position. However, a direct lateral pressure against either end of the guard element will readily swing it for disengagement of the tongue from the channel and into parallelism with the bumper impact bar where it will be out of the way, and a direct lateral pressure will restore the guard element to its interlocked or service position.

Figure 8 shows an arrangement for supporting the guard structure where the bumper impact bar is not provided with a bolt hole. The bracket structure comprises the plate 27 having the longitudinally extending flanges 28 provided with recesses 29 in their outer edges for receiving and fitting against the bumper impact bar I. A clamping plate or strap 29 is shaped to fit against the inner side of the impact bar, and the bracket plate and the clamping plate are apertured at their upper and lower ends for receiving bolts 30 so that the impact bar is firmly clamped between the bracket plate and the clamping plate. The plate 27 is deflected inwardly to provide the longitudinally extending channel 31, and its central portion 32 is deflected outwardly to form a circular seat on its outer side.

The guard element G has the plate 34 secured thereto which is deflected outwardly to form a rectangular tongue structure 35, this tongue structure at its central portion being deflected outwardly to form a bearing socket or recess 36 for receiving the deflected seat portion 32 of the plate 27, the portions of the tongue structure 35 above and below the recess portion 36 extending into and mating with the portions of the channel 31 above and below the deflection 32 of the bracket plate, when the guard element is in its vertical or service position. A bolt or stud 37 is extended through the hole 38 in the recess portion 36 of the guard element, and the reduced end 39 of the bolt extends through the hole 40 in the seat portion 32 of the bracket structure, the end of the bolt being then riveted over against the inner side of the seat portion 32 so that the bolt will be rigidly secured to the bracket structure. A spring 41 encircles the bolt between its head and the recess portion 36 of the guard element and tends to hold the tongue structure in interlocking engagement with the channel of the bracket when the guard element is in service position. To move the guard element out of the way, a lateral pressure against either end thereof will turn it into its horizontal position, the tongue and channel structure being automatically disengaged during such turning of the guard element. Any bumps against the front of the guard element along the ends thereof may effect rocking of the element a limited distance until the spring has been fully compressed, but such rocking will result only in firmer tongue and channel interlock so that the guard element will not be turned out of its service position.

It will be noted that in the various structures shown the bolt and the spring are within the guard element so as to be invisible from the front of the guard structure, and also to be fully protected.

I have shown practical and efficient embodiments of my invention, but I do not desire to be limited to the exact construction, arrangement and operation shown and described, as changes and modifications may be made without departing from the scope of the invention.

I claim as follows:

1. A bumper guard structure comprising a support element attachable to a bumper bar, and a guard element, means affording a pivot on which the guard element may be rotated relative to the supporting element, tongue and groove interlocking connection for said elements and above and below said pivot, and means for yieldably holding said elements together with the tongue and groove connection in interlocking position when said guard element is in service position, whereby said tongue and groove connection is completely separable by the rotational movement of said guard element from service position on said pivot in a plane parallel with the bumper bar but cannot be completely separated by swing of the guard from service position in a plane at right-angles to the bumper bar.

2. A bumper guard structure comprising a supporting element attachable to a bumper bar, and a guard element, means providing a pivot on which said guard element may be turned relative to said supporting element, tongue and groove connection for said element above and below said pivot, spring means tending to hold said elements together and said tongue and groove connections interlocked when said guard element is in vertical or service position, said tongue and groove connection being releasable from interlock by the turning of the guard element on said pivot in a plane parallel with the plane of the bumper bar but being unreleasable by swing of the guard in a plane at right-angles to the bumper bar.

3. A bumper guard structure comprising a support element attachable to a bumper bar, and a guard element, means pivoting said guard element intermediate its ends for lateral rotation relative to said support element, spring means tending to hold said elements together in the direction of the pivot axis, interlocking formations on said elements above and below the pivot axis held in interlocking engagement when said guard element is in vertical or service position, the arrangement being such that said formations cooperate to cam said guard element bodily away from said support element in the direction of the pivot axis when said guard element is turned laterally in a plane at right-angles to the pivot axis toward a horizontal position, and when said guard element is swung from service position in the plane of the pivot axis the formations at one side of the pivot axis will remain interlocked to prevent lateral turning of the guard element.

4. A bumper guard structure comprising a support element attachable to a bumper bar, and a guard element extending vertically above and below the support element, said support element having a vertically extending groove and said guard element having a vertically extending tongue, a pivot stud extending from said support element intermediate the upper and lower ends of said groove and said guard element tongue having an opening intermediate its ends for said stud, a spring on said stud holding said tongue and groove in interlocking engagement when said guard element is in vertical or service position, the arrangement being such that said tongue and groove will be separated upon lateral rotational movement of said guard element from service position in a plane parallel with the bumper bar but when said guard element is swung from service position in a plane at right-angles to the bumper bar the tongue and groove at one side of the stud will remain in interlocking engagement and prevent lateral rotational movement of the guard element.

RAY A. SANDBERG.